United States Patent [19]

Fisher et al.

[11] Patent Number: 5,246,791
[45] Date of Patent: Sep. 21, 1993

[54] FUEL CELL CONTAINING A REFORMING CATALYST

[75] Inventors: Janet M. Fisher, Reading; Philip S. Bennett, Oxfordshire, both of United Kingdom

[73] Assignee: Johnson Matthey Public Limited Company, London, England

[21] Appl. No.: 902,562

[22] Filed: Jun. 22, 1992

Related U.S. Application Data

[63] Continuation of Ser. No. 668,731, Mar. 12, 1991, abandoned, which is a continuation of Ser. No. 372,700, Jun. 28, 1989, abandoned.

[30] Foreign Application Priority Data

Jul. 6, 1988 [GB] United Kingdom ............... 8816114

[51] Int. Cl.[5] ............................................. H01M 8/14
[52] U.S. Cl. ........................................ 429/16; 429/20; 429/40; 429/44
[58] Field of Search ..................... 429/40, 44, 16, 20

[56] References Cited

U.S. PATENT DOCUMENTS

| | | | |
|---|---|---|---|
| 3,400,119 | 9/1968 | Le Duc | 429/44 |
| 3,438,815 | 4/1969 | Giner | 429/44 |
| 3,619,296 | 11/1971 | Niedrach et al. | 429/42 |
| 3,956,191 | 5/1976 | Cusumano | 502/330 |
| 4,125,565 | 11/1978 | Antos | 502/326 |
| 4,186,110 | 1/1980 | Jalan et al. | 502/185 |
| 4,202,934 | 5/1980 | Jalan | 502/185 |
| 4,214,970 | 7/1980 | Spaziante et al. | 502/326 |
| 4,522,894 | 6/1985 | Hwang et al. | 429/17 |
| 4,701,434 | 10/1987 | Köll | 502/326 |
| 4,702,973 | 10/1987 | Marianowski | 429/41 |
| 4,794,054 | 12/1988 | Ito et al. | 502/326 |
| 4,802,958 | 2/1989 | Mazanec et al. | 429/40 |

FOREIGN PATENT DOCUMENTS

| | | |
|---|---|---|
| 0173904 | 3/1986 | European Pat. Off. |
| 0266861 | 5/1988 | European Pat. Off. |
| 1408215 | 7/1965 | France |
| 1417111 | 10/1965 | France |
| 61-34865 | 2/1986 | Japan |
| 61-260554 | 11/1986 | Japan |
| 1154521 | 6/1969 | United Kingdom |
| 1154522 | 6/1969 | United Kingdom |

OTHER PUBLICATIONS

N.T.I.S. Technical Notes, No. 2, part C, Feb. 1986, Springfield, Va., US; "Methanol fuel cell".
Chemical Abstracts, vol. 104, No. 24, Jun. 16, 1986, p. 163, Abstract No. 210058s, Columbus, Ohio, US; & JP-A-61 34 865 (Hitachi, Ltd.) Feb. 19, 1986.
Chemical Abstracts, vol. 110, No. 13, Jun. 26, 1989, p. 186, Abstract No. 234664m, Columbus, Ohio, US; & JP-A 63 310 574 (Tokyo Gas Co., Ltd. et al.) Dec. 19, 1988.
Gould, R., et al. *Fel Cell Systems II, Advances In Chemistry Series*, ©1969 ACS, pp. 394-401.

*Primary Examiner*—George Fourson
*Attorney, Agent, or Firm*—Stevens, Davis, Miller & Mosher

[57] ABSTRACT

A high temperature fuel cell containing a reforming catalyst with improved resistance to deactivation by the electrolyte of a high temperature fuel cell comprising ruthenium on a support.

4 Claims, 1 Drawing Sheet

FUEL CELL CONTAINING A REFORMING CATALYST

This application is a continuation of application Ser. No. 07/668,731, filed Mar. 12, 1991, now abandoned, which is a continuation of application Ser. No. 372,700, filed Jun. 28, 1989, now abandoned.

This invention relates to catalysts for reforming fuels and in particular catalysts for the reforming of fuels in a fuel cell.

Fuel cells which operate at high temperatures (500°-1000° C.) such as molten carbonate and solid oxide cells generate 'high grade' heat. The reforming of methane, for example, is an endothermic reaction which can use the 'high grade' heat generated by the cell and so dispense with the need for heat exchangers and other forms of heating the reforming catalyst.

The electrolyte for molten carbonate fuel cells is a mixture of molten alkali carbonates and for most cells a binary eutectic containing 62 mol % $Li_2CO_3$ and 38 mol % $K_2CO_3$ is used. These carbonate electrolytes are corrosive. Since molten carbonate fuel cells operate at a temperature of between 600° C. and 700° C. the components of a fuel cell such as anodes, cathodes, separator plates, etc, must be corrosion resistant and heat stable. Materials presently used are nickel, lithium aluminate and stainless steel.

Nickel with iron or copper, copper, zinc and iron are known catalysts for the reforming of fuels within a fuel cell. These catalysts, however, suffer from corrosion by the molten carbonate electroyte. A further problem which has been identified is the deactivation which occurs when the molten carbonate coats or 'wets' the surface of the catalyst.

An object of the present invention is to provide an improved catalyst for the reforming of a fuel, capable of being positioned within a high temperature fuel cell and with improved corrosion resistance and/or activity.

A further object of the present invention is to provide a catalyst with increased resistance to deactivation by the electrolyte of a high temperature fuel cell.

According to a first aspect of the present invention, there is provided a high temperature fuel cell reforming catalyst comprising one or more metals selected from the platinum group metals and noble metals on a support, the catalyst in use reforming hydrocarbon containing fuel.

According to a second aspect of the present invention, there is provided a high temperature fuel cell comprising a reforming catalyst selected from one or more of the platinum group metals and noble metals.

Preferably, the catalyst has a resistance to wetting such that the contact angle between a carbonate of composition 62 mol % $Li_2CO_3$, 38 mol % $K_2C0_3$ at 650° C. under a hydrogen atmosphere and the catalyst is greater than 65°.

Preferably, the catalyst comprises one or more of rhodium, ruthenium, platinum and gold. Desirably, the said metals may be used together with nickel. Most preferably, the catalyst comprises ruthenium optionally together with nickel.

According to a further aspect of the present invention a process for the reforming of a hydrocarbon containing fuel within a high temperature fuel cell comprises contacting a gas stream containing a hydrocarbon fuel with a catalyst comprising one or more metals selected from the platinum group metals and noble metals on a support.

The reforming catalyst may be supported on a ceramic support such as granules or pellets of zirconia, ceria, magnesia or one or more rare earth oxides or on a metal support of, for example, nickel or stainless steel. Preferably the ceramic support for the reforming catalyst is selected from zirconia, ceria or magnesia. The platinum group metal or noble metal can be coated on to, for example, zirconia granules by contacting the granules with a solution of the platinum group metal or noble metal. Metal supports may also be coated by electroless deposition. Other methods of deposition may be used without departing from the scope of the present invention.

BRIEF DESCRIPTION OF THE DRAWINGS

In FIG. 1 the material is said to be "wet" by the carbonate with FIG. 2 showing a material with a higher resistance to wetting and FIG. 3 showing a material with very good resistance to wetting.

In order to evaluate the corrosion resistance of various metals and alloys a series of corrosion tests were conducted. Samples of the materials were placed in contact with 62 mol % $Li_2CO_3$ 38 mol % $K_2CO_3$ molten carbonate at a temperature of 650° C. The carbonate was purified prior to use in order to remove traces of oxide and hydroxide by passing 99.995% pure $CO_2$ (less than 1 ppm $O_2$) through the molten salt for 24 hours. This purification was carried out under a $CO_2$ atmosphere. The molten salt was contained in a solid gold crucible. The samples of material were in the form of 1×2 cm foils or sheets. The ruthenium sample was prepared by pressing ruthenium powder into a small disc and melting the disc under an argon arc. Each sample was degreased in acetone before being subjected to the corrosion test.

The material to be tested was weighed and placed in a small gold crucible together with 0.5-06 g of the purified carbonate so that a third to a half of the sample was submerged. The samples were inclined from the bottom of one side of the crucible to the top of the other side. The crucible was then heated under a $CO_2$ atmosphere to melt the carbonate and 'anchor' the sample to the crucible. After cooling the crucible was placed in a stainless steel test chamber. To simulate the conditions in a molten carbonate fuel cell the crucible was kept at a temperature of 650° C. and in contact with an inlet gas stream of $H_2$ 68%, $CO_2$ 17% and $H_2O$ 15%. The results of these tests are given in Table 1 below.

TABLE 1

| Material | Duration of test (h) | Initial weight (g) | % Weight change | Weight change (g) |
|---|---|---|---|---|
| Rhodium | 93.6 | 0.604 | 0.33 | −0.002 |
| Ruthenium | 93.6 | 0.940 | 0.21 | +0.002 |
| Platinum | 93.1 | 0.369 | 0.54 | +0.002 |
| Palladium | 93.1 | 0.816 | 0.49 | +0.004 |
| Silver | 93.6 | 1.760 | 0.08 | +0.001 |
| Copper | 92.6 | 2.2937 | 1.2 | +0.0281 |
| Aluminium | 93.6 | Material totally destroyed | | |
| Stainless Steel 310 | 92.1 | 4.177 | 0.6 | +0.023 |
| Nickel 200 | 90.1 | 2.731 | 0.1 | +0.002 |
| Titanium | 97.0 | 0.605 | 0.7 | +0.340 |

The results in the table above indicate that the platinum group metals such as rhodium, platinum and ruthenium are corrosion resistant to molten carbonate under the conditions used in fuel cells. The nickel 200 is a high purity metal with a purity of 99.5%.

A previous test in which molten carbonate (30 g) was contained within a gold crucible for 48 hours under a $CO_2$ atmosphere indicated that gold does not dissolve in molten carbonate. The weight of the crucible was unchanged and an analysis of the carbonate found no traces of gold.

Figure 1:
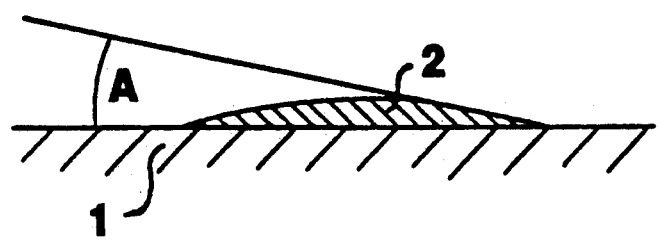
FIGS. 1-3 show a portion of material (1) on which a small amount of molten carbonate (2) is positioned.
Figure 2:
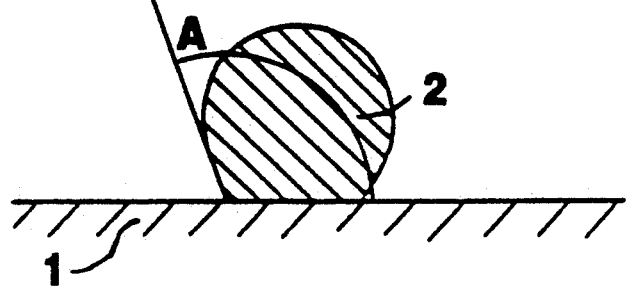
Figure 3:
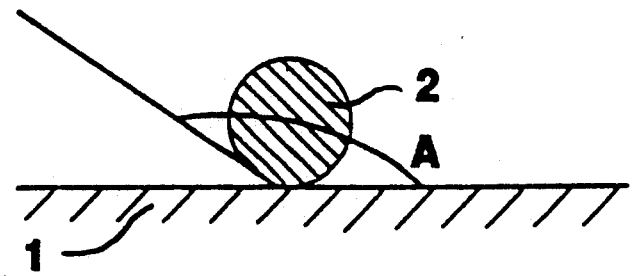

The activity of a catalyst decreases as the amount of molten carbonate is in contact with the catalyst increases and the catalyst becomes coated or 'wetted'. An indication of the susceptibility of a material such as a catalyst to become coated or wetted is given by the 'contact angle'. This is the angle which a liquid, for example a molten carbonate, makes with the material. The higher the contact angle, the greater the resistance of a material to coating or wetting by the liquid. FIG. 1 shows a portion of a material 1 on which a small amount of molten carbonate 2 is positioned. The contact angle A which is the angle the carbonate makes with the material is below 20° and the material is said to be "wet" by the carbonate. FIG. 2 shows a small amount of molten carbonate 2 on a material 3 with an improved resistance to wetting. The contact angle is above 20°. FIG. 3 shows a material 4 with very good resistance to wetting and a contact angle greater than 90°.

The contact angles for a number of materials in contact with a small amount of molten carbonate were measured. The samples of materials were 1×1 cm foils which were degreased in acetone prior to testing. The material to be tested was placed on the workstage in a work chamber of a hot stage microscope. A crystal of molten carbonate (purified as described above was placed on the sample and the work chamber evacuated to $10^{-3}$ mbar and then filled with hydrogen to a low pressure. The sample was heated to the appropriate temperature and the wetting angle measured. The results of the tests are given below in Table 2.

TABLE 2

| Material | Temperature °C. | | |
|---|---|---|---|
| | 600 | 625 | 650 |
| Rhodium | 90 | 83 | 68–70 |
| Ruthenium | 104 | 90 | 89–90 |
| Platinum | | | 22 |
| Palladium | | | 40–42 |
| Nickel 200 | 72 | 65 | 60 |
| Gold | 99 | 77 | 66 |
| Stainless Steel 310 | | | 37 |

From the results given in the table above it can be seen that rhodium, ruthenium and gold exhibit a higher contact angle in a hydrogen atmosphere than the other platinum group metals, nickel and stainless steel and therefore the resistance to wetting by the molten carbonate is greater.

The measurements of contact angles for a number of materials in contact with a small amount of molten carbonate in the presence of a hydrogen/carbon dioxide atmosphere were also measured. Samples of the materials in the form of metal coupons, 2×1 cm, were rubbed with emery paper before polishing with diamond paste (1 μm) to provide a smooth surface finish. The samples were degreased in acetone prior to testing. As with the previous samples the material to be tested was placed on the workstage in a work chamber of the hot stage microscope. A crystal of molten carbonate (purified as described above was placed on the sample and the work chamber evacuated to $4 \times 10^{-2}$ mbar and then filled with a mixture of hydrogen and carbon dioxide comprising $H_2$ 80%, $CO_2$ 20%. The sample was heated to 650° C. and the wetting angle measured. The results of the tests are given below in Table 3.

TABLE 3

| MATERIAL | WETTING ANGLE AT 650° C. |
|---|---|
| Rhodium | 43 |
| Ruthenium | 92 |
| Platinum | 49 |
| Palladium | 41 |
| Nickel 200 | 50 |
| Gold | 63 |
| Silver | 63 |
| Copper | 88 |

The results given in Table 3 above indicate that ruthenium and gold exhibit a higher contact angle than nickel and therefore the resistance to wetting by molten carbonate is greater.

The invention is further illustrated by the following Examples 1–12 and Comparative Examples A, B and C.

EXAMPLES 1 AND 2

Catalysts comprising 4.7% Ni 0.1% Rh, Example 1, and 7.4% Ni 0.1% Rh, Example 2, supported on zirconia granules were prepared by impregnating zirconia granules with solutions of $NiNO_3$ and $RhNO_3$.

EXAMPLES 3 AND 4

Catalysts comprising 5.3% Ni 0.1% Ru, Example 3, and 9% Ni 0.1% Ru, Example 4, supported on zirconia granules were prepared. Solutions of $NiNO_3$ and $RuCl_3$ were used to impregnate zirconia granules.

EXAMPLE 5

Example 5 was prepared by impregnating zirconia granules with a solutions of $NiNO_3$ and $PdNO_3$. The example comprised 6.1% Ni 0.1% Pd.

EXAMPLES 6 AND 7

Catalysts comprising 6.5% Ni 0.1% Pt and 9.2% Ni 0.1% Pt respectively supported on zirconia granules were prepared. Solutions of $NiNO_3$ and $Pt(NH_3)_4Cl_2$ were used.

COMPARATIVE EXAMPLES A AND B

Comparative Examples A and B, 7.9% Ni and 10.7% Ni respectively, were prepared by impregnating zirconia granules with a solution of $NiNO_3$. These comparative examples illustrate the activity of conventional reforming catalysts for use within a high temperature fuel cell.

The catalysts of Examples 1–7 and Comparative Examples A and B were each placed in an experimental test rig. A gas stream comprising methane approximately 5%, $H_2O$ as steam approximately 15% and remainder nitrogen with a steam to carbon ratio of 2.5 was passed over the catalyst at a gas hourly space velocity (GHSV) of 100,000 hr$^{-1}$ (GHSV is the volume of gas passing through the testing per hour divided by the volume of the catalyst bed). Measurements of the gas composition before and after the catalyst were made at temperatures of 600° C., 625° C. The results are given in Table 4 below.

TABLE 4

| Example | Catalyst Composition | Activity μmol CH₄ converted g⁻s⁻¹ atm⁻¹ Temperature °C. | | |
|---|---|---|---|---|
| | | 600 | 625 | 650 |
| A | 7.9% Ni | 570 | 700 | 790 |
| 1 | 4.7% Ni 0.1% Rh | 820 | 940 | 1060 |
| 3 | 5.3% Ni 0.1% Ru | 960 | 1070 | 1220 |
| 5 | 6.1% Ni 0.1% Pd | 510 | 580 | 680 |
| 6 | 6.5% Ni 0.1% Pt | 940 | 1050 | 1230 |
| B | 10.7% Ni | 960 | 1140 | 1300 |
| 2 | 7.4% Ni 0.1% Rh | 1000 | 1220 | 1390 |
| 4 | 9.0% Ni 0.1% Ru | 1080 | 1270 | 1430 |
| 7 | 9.2% Ni 0.1% Pt | 980 | 1100 | 1280 |

The results for the Examples 1-4 in the table above indicate that the addition of rhodium and ruthenium to a conventional nickel catalyst for the reforming of methane improves the activity of the catalyst

EXAMPLES 8-11

Catalysts comprising 0.5% Ru, Example 8, 0.9% Ru, Example 9, 1.5% Ru, Example 10 and 4.0% Ru Example 11 supported on magnesia granules were prepared by impregnating magnesia granules with solutions of RuCl₃ in ethanol.

COMPERATIVE EXAMPLE C

The catalyst of Comparative Example C was a commercially available catalyst supplied by BASF (reference G1-25 S) comprising 19% nickel on aluminum.

The catalyst of Examples 8-11 and comparative Example C were each tested in the experimented test as described above for Examples 1-7. The results obtained are given in Table 5 below.

TABLE 5

| Example | Catalyst Composition | Activity at 650° C. μmol CH₄ converted g⁻¹s⁻¹ atm⁻¹ |
|---|---|---|
| 8 | 0.5% Ru | 1050 |
| 9 | 0.9% Ru | 1550 |
| 10 | 1.5% Ru | 1500 |
| 11 | 4.0% Ru | 1910 |
| C | 19% Ni | 910 |

The results for the Examples 8-11 in the above show the improved activity of ruthenium on magnesia catalyst for the reforming of methane when compared with a commercially available catalyst.

EXAMPLE 12

A catalyst comprising 4.0% Ru on magnesia was prepared by impregnating magnesia granules with a solution of RuCl₃ in ethanol. The catalyst was tested in the experimental test rig as described above for Examples 1-7 for a period of 116.5 hours. The activity of the catalyst was 86.70% that of the fresh catalyst.

We claim:

1. A high temperature fuel cell comprising a molten carbonate electrolyte, containing a reforming catalyst in contact with a hydrocarbon-containing fuel and subject to contact with the molten carbonate electrolyte, said reforming catalyst comprising ruthenium carried on a support and acting to reform said hydrocarbon-containing fuel to a hydrogen-containing fuel for the fuel cell.

2. The high temperature fuel cell of claim 1, wherein the support comprises one or more rare earth oxides, zirconia, ceria or magnesia.

3. The high temperature fuel cell of claim 1, wherein the support comprises magnesia.

4. The high temperature fuel cell of claim 1, wherein the reforming catalyst further comprises nickel.

* * * * *